Dec. 14, 1937.        L. E. WARNER         2,101,883
               PAVING JOINT FILLER
                Filed July 9, 1930
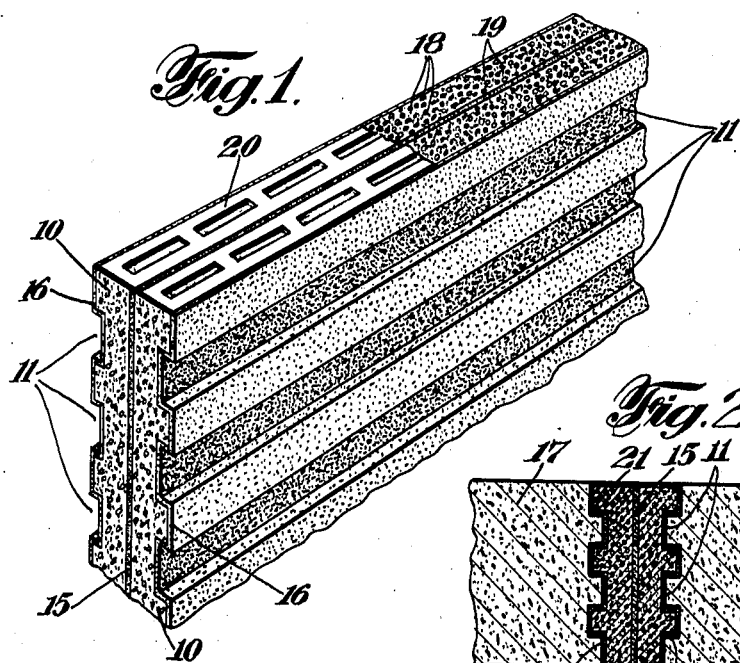
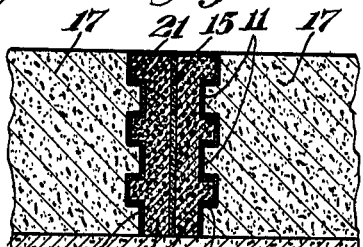
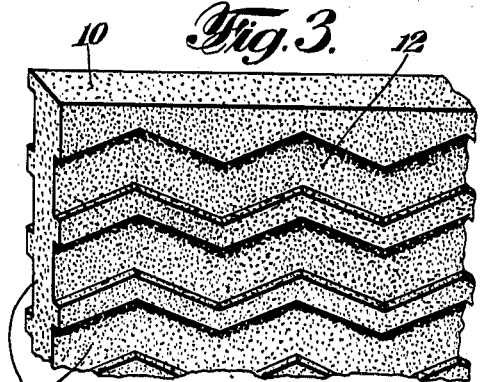
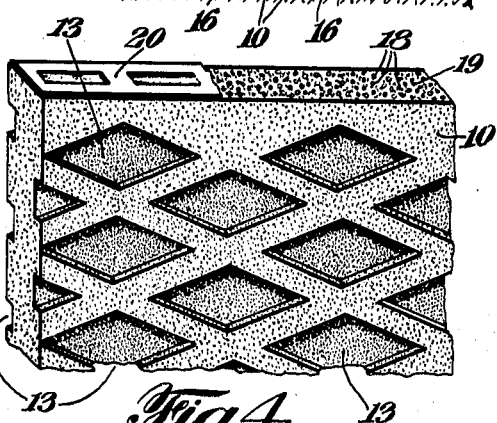
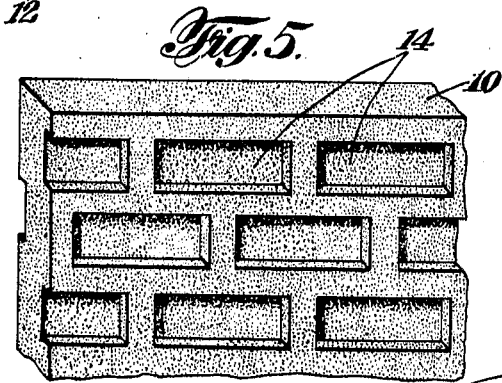
Leroy E. Warner INVENTOR
ATTORNEY Patented Dec. 14, 1937

2,101,883

UNITED STATES PATENT OFFICE 2,101,883

PAVING JOINT FILLER

Leroy E. Warner, Bond Hill, Ohio, assignor to The Philip Carey Manufacturing Company, a corporation of Ohio Application July 9, 1930, Serial No. 466,774

12 Claims. (Cl. 94—18)

My present invention relates to pavement joints and more particularly to an elastic filler therefor, one that will substantially fill the joint space irrespective of the contraction or expansion of the adjacent structures.

An object of my invention is to provide a filler for pavement joints which will interlock in such a way with the pavement that a parting thereof will be practically impossible.

A further object of my invention is to provide in combination with a yielding joint filler, a means whereby a displacement of the filler at the joint will be practically impossible.

Another object of my invention is to provide a pavement joint filler which will, under compression and extension, maintain a tight seal, at the pavement joint, which is substantially impervious to water and other materials.

My invention also provides a filler for a pavement joint that may be utilized as a form strip in the laying of concrete and functions as an elastic expansion and as an elastic contraction joint filler to compensate for the movement of the adjacent pavement due to temperature changes.

Other objects and advantages of my invention will be in part evident and in part pointed out hereinafter as the specification proceeds.

In carrying out my invention, I propose to form the side and/or the edge surfaces with areas in different planes such as recesses or grooves of any suitable configuration in the faces of the filler material. In the preferred embodiment of my invention this packing material is constructed in accordance with the disclosure of my Patent No. 2,016,404, issued October 8, 1935 from application Serial Number 352,117 filed April 3rd, 1929 in which the packing member is described as formed of a composition of cellular rubber, which material has been found to possess the characteristics of being non-absorbent, yet sponge-like with elastic, waterproof and flexible qualities, that lend it to this use. As explained in said application a suitable composition to form the packing is a rubber compound containing rubber, asphaltum, etc., formed into a sheet placed in a suitable press and cured under pressure with heat treatment. I desire to have it understood, however, that I do not limit myself to a filler material of the above character, as any other materials affording the elastic and other qualities may be used with equal effectiveness.

For a better understanding of my invention, reference should be had to the accompanying drawing, wherein I have shown by way of illustration and not of limitation certain preferred adaptations thereof.

In the drawing—

Fig. 1 is a fragmentary, perspective view of one form of my invention,

Fig. 2 is a cross section of my joint in use, and

Figs. 3, 4 and 5 are modified forms which embody the fundamental principles.

In Fig. 1, 10 designates an elastic preformed packing member which in practice may be of any predetermined desired length and breadth. This elastic packing member has an intermediate strip 15 which is of any suitable flexible material, such as a waterproofed felt, that will tend to reinforce the body 10 or to limit to some degree the flexibility of the joint. If desired, a like flexible material 16, 16, of waterproofed felt, may be applied to either one or both faces of the body 10 as shown. Any suitable material may be used for the materials 15 and 16 such as a flexible metal or other flexible fabric sheet material, or thin sheets of wood, or a felt either dry or saturated with a waterproofing, etc. Formed in the sides or faces of the member 10, I show a plurality of depressions 11, forming areas in different planes, arranged in spaced relation. The function of these depressions 11 is to receive a portion of the concrete when it is poured so as to permit the formation of a tongue-like projection which will serve to interlock the filler and adjacent paving 17.

I desire to point out while I prefer that the concrete and the filler interlock and form a seal, under some circumstances the tongues formed within the grooves 11, instead of adhering to the filler, may move freely therein with a sliding fit. In any event, however, it will be seen that in some forms of my invention when the grooves 11 are formed relatively deep, it will be possible for the concrete of the pavement to move free of the filler proper to a distance less than the depth of the depressions without opening the joint completely.

In Fig. 1, I have also shown a central reinforcement 15 which may or may not be used depending upon the rigidity required for the filler. If desired, the central reinforcement 15 could be used without the surface reinforcement 16, or, the surface reinforcement 16 could be used without the central reinforcement 15, or, only one of the reinforcements could be used, and in some cases the filler could be made without any of the reinforcements, 15 or 16.

In Fig. 3 of the drawing, instead of the straight depressions 11, I show a plurality of irregular surface depressions 12 which extend throughout the length of the filler. With this arrangement, it will be seen, that in addition to preventing a movement of the filler vertically, the depressions will also have a tendency to prevent any sidewise movement of the filler between the pavement sections.

In Fig. 4, instead of continuous depressions such as those designated by the numerals 11 and 12 in Figs. 1 and 3, respectively, I show staggered diamond-shaped surface depressions 13 that, by their arrangement, form overlapping projections upon the concrete sections which in effect produce the same result as that sought in Fig. 3. Instead of the diamond-shaped depressions as illustrated in Fig. 3, I may provide as shown in Fig. 4 overlapping rectangular portions 14 or any other configuration which will accomplish the same result.

When the sides of the filler are faced with the flexible sheet material, 16, 16, particularly if the sheet material is a felt saturated with a bituminous containing saturant such as asphalt, the tendency is for the same to bond with the adjacent pavement and thereby form a waterseal between the pavement and the filler and also protect the rubber body against any deteriorating elements such as oils, water, air, etc.

The side surfacing sheet, 16, 16 also serves to protect the rubber body from destructively deteriorating when the fillers are laying out exposed to the elements before being placed in the pavement.

In the preferred form of my joint I use an elastic body 10 having a plurality of enclosed independent air cells 18 surrounded by an elastic material 19 and provided with a surface film or layer 20 sealing the cellular body against entrance of foreign material. This film or layer 20 may be formed of a portion of the elastic body material 19 without the cells 18 thereby forming a film or layer integral with the cellular portion of the body 10, or it may be a separate film or layer. In Fig. 1, I have shown the body 10 formed from a cellular rubber material having the film 20 integral with the cellular portion of the body. In Fig. 1 for clearness I have shown a portion of the film 20 removed. On the surface of one or more edges of the filler, I may also provide areas in the surface arranged in different planes and of any desired configuration for interlocking with any adjacent portion of the construction in which the filler is used or for purpose of identification of the filler, for which latter purpose the size of kind of filler could be marked in the surface of any portion of the filler.

While in the drawing I have shown a filler using a cellular body material in which there are an infinite number of relatively small air cells surrounded by an elastic membrane enclosing the cells, which is the preferred because of the non-porous or water-proof qualities that flow from such a structure without affecting the elastic qualities and which enables me to use a cellular filler material without the film 20 if desired, I would also have it understood that a porous body could be used, that is, a body in which there is an infinite number of cells interconnecting, as in the well known and common rubber bath sponge. Using this material, however, for the filler by reason of its porous character, I prefer to provide the film 20 which is non-porous and serves to enclose the porous body, thereby keeping out water, moisture, etc. If, however, it is desired, the so-called porous type of filler material could be used and after the filler was installed between the adjacent structural members 17, a seal 21 could be applied over the surface; such for instance, as an asphalt material or other suitable material, or, even an elastic compound could be applied.

I claim:

1. A joint filler for pavements consisting of a rubber body portion provided with a multiplicity of independent cells therein, each of said cells enclosed and separated from adjacent cells by the rubber forming said body portion, said body portion having a rubber surface of texture different from the texture of the body portion.

2. A joint filler for pavements consisting of a rubber body portion provided with a multiplicity of independent cells therein, each of said cells enclosed and separated from adjacent cells by the rubber forming said body portion, portions of a surface of the body arranged in different planes, and means adapted to limit the flexibility of said body portion.

3. A joint filler for pavements consisting of a rubber body portion of cured rubber compound provided with a multiplicity of independent cells therein, each of said cells enclosed and separated from adjacent cells by the rubber forming said body portion, portions of a surface of the body arranged in different planes, and means adapted to limit the flexibility of said body portion.

4. A joint filler for pavements consisting of a rubber body portion provided with a multiplicity of independent cells therein, each of said cells enclosed and separated from adjacent cells by the rubber forming said body portion, portions of a surface of the body arranged in different planes, and means sealing a surface thereof.

5. A joint filler for pavements consisting of a rubber body portion provided with a multiplicity of independent cells therein, each of said cells enclosed and separated from adjacent cells by the rubber forming said body portion, and provided with a surface having areas in different planes.

6. A construction material consisting of a body portion of cured rubber compound having a multiplicity of cells, enclosed and separated from each other by the rubber of said body portion, and provided with an integral surface of texture different from the texture of said body portion.

7. A construction material consisting of a rubber body portion having a multiplicity of cells, enclosed and separated from each other by the rubber of said body portion, and provided with a rubber surface of texture different from the texture of said body portion and integral with said body portion.

8. A joint filler for pavements consisting of a rubber body portion provided with a multiplicity of cells enclosed and separated from each other by the rubber forming the body portion, said joint filler provided with a non-cellular covering of waterproof material.

9. In a construction adjacent members, a space between said members, a filler for said space consisting of a rubber body portion containing a multiplicity of cells enclosed and separated from each other by the rubber in said body portion, and having a rubber surface of different texture from the body portion.

10. In a pavement adjacent paving members, a space between said members, a filler in said space terminating below the surface of said members and means consisting of a body of cured rubber compound sealing the space above the filler between said members to prevent passage of material into said space or into said filler.

11. A joint filler composed of a resilient elastic rubber body provided with a multiplicity of independent cells and having a means embedded therein to limit the flexibility of the body.

12. A joint filler composed of a resilient elastic rubber body provided with a multiplicity of independent cells, means embedded within the body to limit its flexibility, and facing material applied to one surface of the body.

LEROY E. WARNER.